Oct. 23, 1928.
H. H. FEBREY
1,688,696
RAIL BOND
Filed March 16, 1927
2 Sheets-Sheet 1
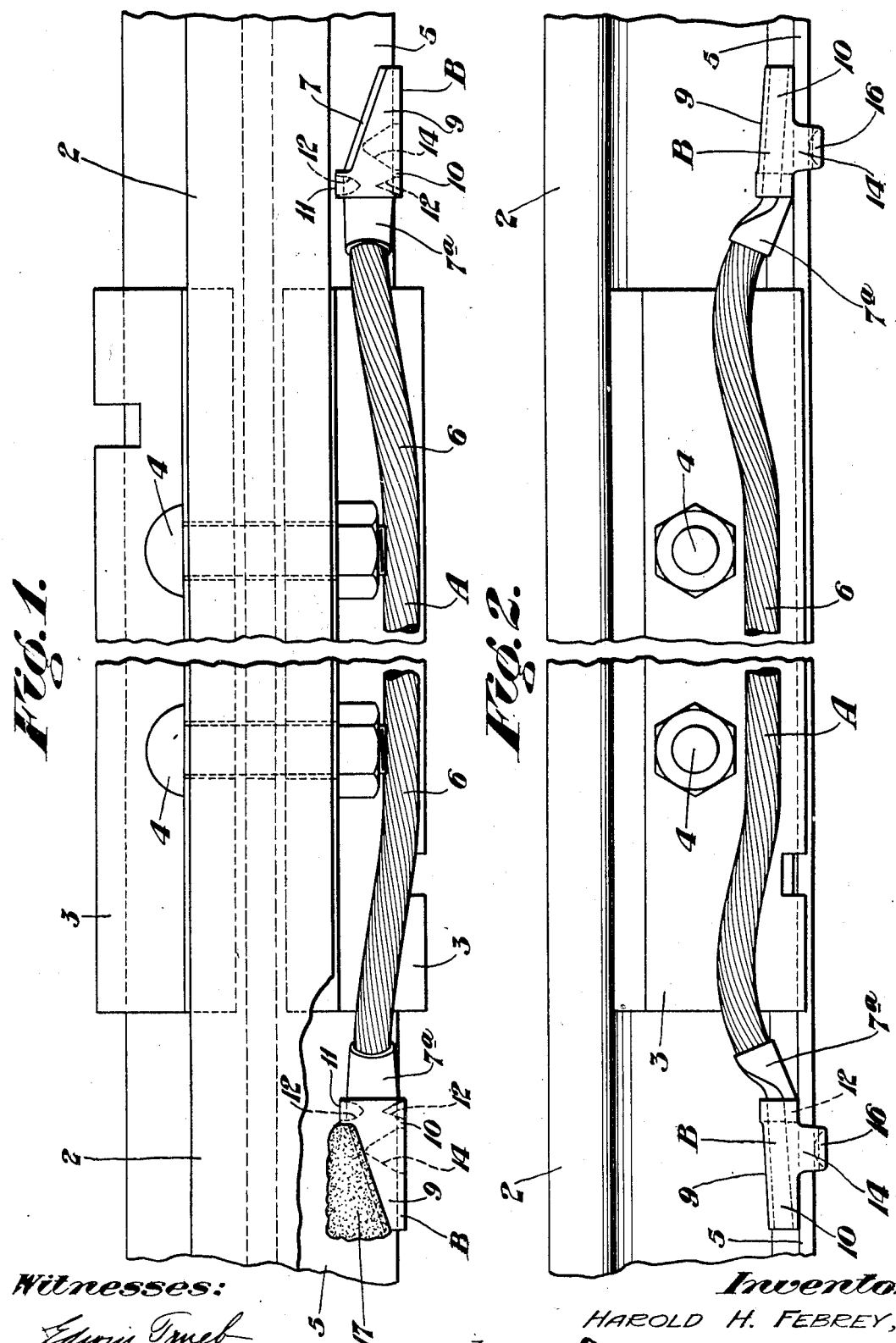
Witnesses:
Edwin Trueb
Inventor:
HAROLD H. FEBREY,
by: D Anthony Usina
his Attorney.

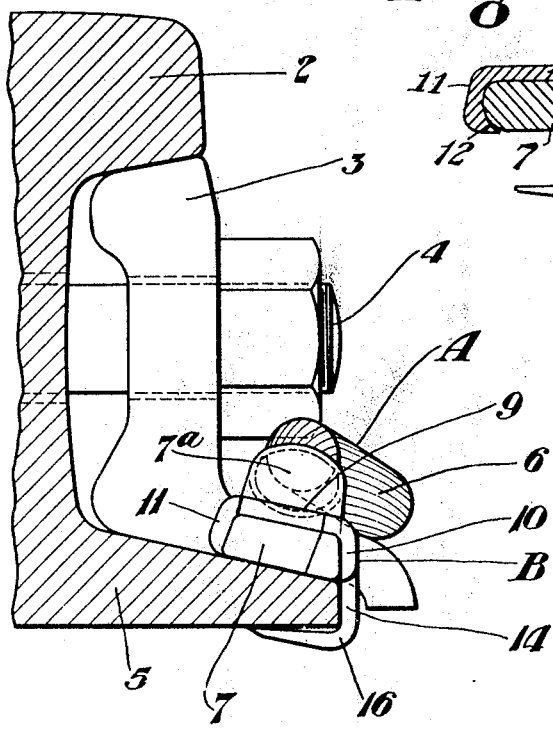
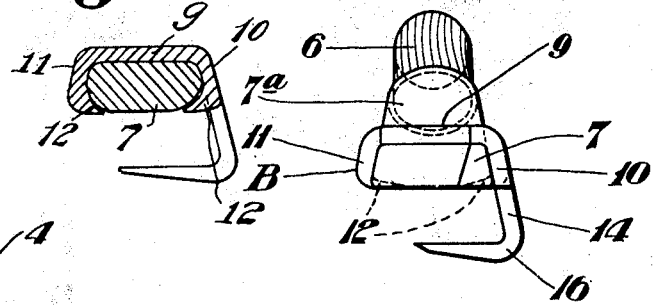
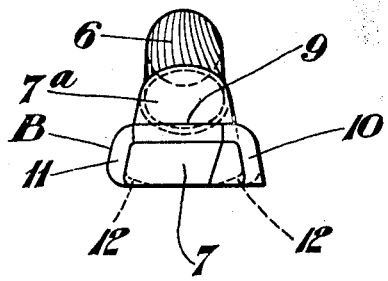
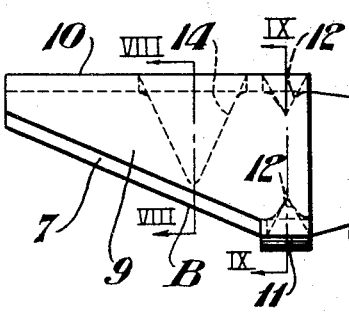
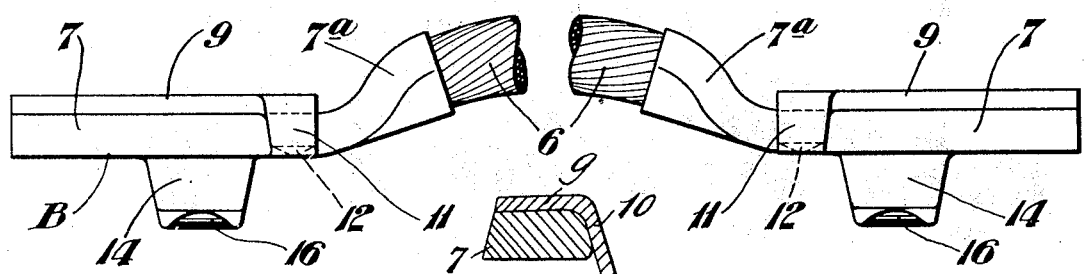

Patented Oct. 23, 1928.

1,688,696

UNITED STATES PATENT OFFICE.

HAROLD H. FEBREY, OF NEWARK, NEW JERSEY, ASSIGNOR TO THE AMERICAN STEEL AND WIRE COMPANY OF NEW JERSEY, A CORPORATION OF NEW JERSEY.

RAIL BOND.

Application filed March 16, 1927. Serial No. 175,817.

This invention relates to rail bonds and, while not limited thereto, relates more particularly to rail bonds adapted to be welded to the rails by the use of an arc, and has for its object the provision of a bond of this class having solid copper terminal members and means for protecting and preventing the destruction of the copper terminals during the welding operation.

A bond having a solid copper terminal provides better electrical conductivity than bonds having ferrous metal terminals or terminals having ferrous metal attaching faces. However, when copper terminals alone are used the terminals are destroyed or injured by the arc when welding the bond to the rails, since the copper terminals melt at a temperature materially lower than that necessary to melt the attaching metal and bring the rail surfaces to a welding heat.

The present invention provides the advantages of a bond having all copper terminals and at the same time provides means for protecting the copper terminal body during the welding operation.

In the drawings—

Figure 1 is a plan view of a rail joint having a bond constructed in accordance with this invention, applied thereto.

Figure 2 is a side elevation of the same.

Figure 3 is an end elevation of the same.

Figure 4 is a plan view of the terminal ends of the bond removed from the rail.

Figure 5 is a side elevation of the same.

Figure 6 is an end elevation of the bond.

Figure 7 is a similar view of a modified construction of bond.

Figure 8 is a transverse sectional elevation taken on the line VIII—VIII of Figure 4.

Figure 9 is a similar view taken on the line IX—IX of Figure 4.

Referring more particularly to the drawings, the numeral 2 designates the rails to be bonded, which are joined by the usual fish plates 3 and bolts 4.

The rail bond of this invention, designated generally by the letter A, is welded to the base flanges 5 of the rails and extends from a point beyond the fish plate 3 on one rail to a similar point on the base flange 5 of the other rail.

The bond A is composed of a stranded copper body portion 6 and copper drop-forged terminal members 7, which are welded or otherwise permanently secured to the body portion 6 and have a sleeve portion $7^a$ extending around the ends of the body 6. The terminals 7 are of the elongated type adapted to lay on the base flange of the rails and preferably have their one side face tapered from a point adjacent their rear end toward their forward or free ends so as to increase the bonding area of the copper terminal which is in contact with the welding metal.

A casing, jacket, or shield B composed of ferrous metal is adapted to be fitted over the terminals 7 and is composed of a top wall 9, and side wall 10 co-extensive with and adapted to overlie the top face and straight side face of the terminals 7. A second relatively short side wall 11 is provided on the jacket or shield B and overlies the short untapered portion of the other side face of the terminals 7.

The jackets or shields B are provided with lugs 12 formed integral with the side walls 10 and 11 and bent under the bottom face of the terminals 7 so as to mechanically hold the jackets or shields B in place.

Preferably a rail attaching lug 14 is formed integral with the side wall 10 of the jacket or shield B and extends downwardly therefrom. The lug 14 is bent inwardly at right angles to the plane of the side wall 10 at a point 16 intermediate its ends so as to form a hooked member adapted to be engaged under the base flange of the rail and to cooperate with the remainder of the terminal to clamp the bond in position prior to welding the bond to the rail.

If desired, the lug 14 may be omitted resulting in the formation of the modified form of terminal as shown in Figure 7.

From the above it will be readily seen that while the protective jacket or shield B covers one side and top face of the bond terminal, the entire bottom face and the major portion of the other side of the bond terminal is exposed, so that the bottom face of the terminal may be contacted directly with the base flange of the rail, and the exposed side face of the terminal may receive the welded attaching metal.

When the bond is positioned on the rails to be bonded, an electric arc or gas flame is used to heat the surfaces to be welded and melt the welding metal, which metal is deposited on the rails and along the exposed side face of the copper terminals 7 forming the body of attaching metal designated by the numeral 17 in the drawings, and forming a perfect union between the rails and the copper terminals.

The jacket or shield B serves to protect the copper terminals 7 from injury due to the intense heat necessary in forming the weld. Unless the welding operation is performed by skilled experts of long experience, the copper terminal, especially at the small end, is quickly melted down, and destroyed so that the terminal surface is reduced and consequently the efficiency of the bond reduced.

The jacket or shield B protects the terminal against being melted, and in the construction of Figures 1 to 6 also serves to provide means for temporarily holding the bond in position prior to welding.

While I have shown and described certain specific embodiments of my invention, it will be understood that I do not wish to be limited thereto since various modifications may be made without departing from the scope of my invention as defined in the appended claims.

The shield B may be used with bonds having steel covered terminals as well as with all copper terminals, and other changes may be made.

I claim—

1. A rail bond adapted to be welded to the rails to be bonded, comprising a flexible body portion, a rigid solid terminal on each end of said body, and ferrous metal jacket members mechanically secured on said terminals and covering at least two sides of said terminals, the bottom face and at least a portion of one side face of said terminal being exposed.

2. A rail bond adapted to be welded to the rails to be bonded, comprising a flexible body portion, a rigid solid terminal on each end of said body, and a ferrous metal jacket member mechanically clamped on each of said terminals, said jacket member being composed of one side and a top wall co-extensive with the top and one side face of the terminal, and a relatively short side wall adapted to extend over a relatively small length of the other side face of said terminal, the bottom face of said terminal being exposed and adapted to contact with the rail, and a portion of said second named side face of said terminal being exposed to receive the attaching metal when the bond is welded in place.

3. A rail bond adapted to be welded to the rail to be bonded, comprising a flexible body portion, a rigid solid copper terminal on each end of said body, and ferrous metal jacket members on said copper terminals, each of said jacket members being composed of one side and a top wall co-extensive with the top and one side face of said copper terminal, and a relatively short side wall adapted to extend over a relatively small length of the other side face of said copper terminal, the bottom faces of said copper terminals being exposed and adapted to contact with the rail and a portion of said second named side face of said terminal being exposed to receive the attaching metal when the bond is welded in place.

4. A rail bond adapted to be welded to the rails to be bonded, comprising a flexible body portion, a rigid solid copper terminal on each end of said body, and ferrous metal jacket members on said copper terminals, each of said jacket members being composed of one side and a top wall co-extensive with the top and one side face of said copper terminal, and a relatively short side wall adapted to extend over a relatively small length of the other side face of said copper terminal, the bottom faces of said copper terminals being exposed and adapted to contact with the rail, and a portion of said second named side face of said terminal being exposed to receive the attaching metal when the bond is welded in place, and lugs formed integral with the side walls of said jacket members and bent so as to overlie the bottom faces of said copper terminals and secure said jackets in position.

5. A rail bond adapted to be welded to the rails to be bonded, comprising a flexible body portion, a rigid solid copper terminal on each end of said body, and ferrous metal jacket members on said copper terminals, each of said jacket members being composed of one side and a top wall co-extensive with the top and one side face of said copper terminal, and a relatively short side wall adapted to extend over a relatively small length of the other side face of said copper terminal, the bottom faces of said copper terminals being exposed and adapted to contact with the rail, and a portion of said second named side face of said terminal being exposed to receive the attaching metal when the bond is welded in place, lugs formed integral with the side walls of said jacket members and bent so as to overlie the bottom faces of said copper terminals and secure said jackets in position, and an attaching lug formed integral with said first named side wall of said jacket members and bent at right angles with said side wall at a point intermediate its ends, said attaching lug being adapted to engage under the flange of the rail being bonded to mechanically hold said bond in position during the welding operation.

In testimony whereof, I have hereunto signed my name.

HAROLD H. FEBREY.